(12) United States Patent
Pan et al.

(10) Patent No.: US 11,637,727 B2
(45) Date of Patent: Apr. 25, 2023

(54) MODULATOR, DEMODULATOR AND WIRELESS COMMUNICATION SYSTEM

(71) Applicant: Shanghai Panchip Microelectronics Co., Ltd., Shanghai (CN)

(72) Inventors: Chenghao Pan, Shanghai (CN); Chuan Wu, Shanghai (CN)

(73) Assignee: Shanghai Panchip Microelectronics Co., Ltd., Shanghai (CN)

( * ) Notice: Subject to any disclaimer, the term of this patent is extended or adjusted under 35 U.S.C. 154(b) by 167 days.

(21) Appl. No.: 17/423,433

(22) PCT Filed: Oct. 10, 2020

(86) PCT No.: PCT/CN2020/120245
§ 371 (c)(1),
(2) Date: Jul. 15, 2021

(87) PCT Pub. No.: WO2021/073461
PCT Pub. Date: Apr. 22, 2021

(65) Prior Publication Data
US 2022/0150095 A1 May 12, 2022

(30) Foreign Application Priority Data
Oct. 14, 2019 (CN) .......................... 201910971545.X

(51) Int. Cl.
*H04L 27/10* (2006.01)
*H04L 27/12* (2006.01)
(Continued)

(52) U.S. Cl.
CPC ............ *H04L 27/122* (2013.01); *H04L 12/16* (2013.01); *H04L 27/148* (2013.01)

(58) Field of Classification Search
CPC ...... H04L 27/14; H04L 27/144; H04L 27/148
(Continued)

(56) References Cited

U.S. PATENT DOCUMENTS

| 7,839,308 B2* | 11/2010 | Kim | ...................... H04L 1/0079 |
| | | | 375/295 |
| 8,254,502 B2* | 8/2012 | Sambhwani | ...... H03M 13/3776 |
| | | | 370/335 |

(Continued)

FOREIGN PATENT DOCUMENTS

| CN | 102546499 | 7/2012 |
| CN | 106130941 | 11/2016 |
| CN | 110493154 | 11/2019 |

*Primary Examiner* — Qutbuddin Ghulamali
(74) *Attorney, Agent, or Firm* — Clement Cheng

(57) ABSTRACT

The invention discloses a modulator, a demodulator and a wireless communication system. The wireless communication system comprises a modulator and a demodulator. The modulator is suitable for generating a target linear frequency modulation signal, wherein the target linear frequency modulation signal is a signal of which the frequency is varied linearly over time, wherein the phase of the target linear frequency modulation signal is determined by an initial frequency and a frequency stepping of the target linear frequency modulation signal, and the frequency stepping is determined by the bandwidth of the target linear frequency modulation signal and the spreading factor of the target linear frequency modulation signal. The demodulator is suitable for demodulating the target linear frequency modulation signal. According to the scheme, power consumption can be reduced while long-distance signal transmission is realized.

20 Claims, 1 Drawing Sheet

(51) Int. Cl.
*H04L 12/16* (2006.01)
*H04L 27/148* (2006.01)

(58) Field of Classification Search
USPC .................................................. 375/262, 375
See application file for complete search history.

(56) References Cited

U.S. PATENT DOCUMENTS

| | | | | |
|---|---|---|---|---|
| 8,660,167 | B2 * | 2/2014 | Wehinger | H04L 1/1819 375/147 |
| 8,705,590 | B2 * | 4/2014 | Wang | H04J 13/12 375/150 |
| 2008/0062069 | A1 * | 3/2008 | Sinclair | H04N 13/344 348/E13.04 |
| 2009/0213908 | A1 * | 8/2009 | Bottomley | H04L 25/03292 375/233 |

* cited by examiner

MODULATOR, DEMODULATOR AND WIRELESS COMMUNICATION SYSTEM

BACKGROUND OF THE INVENTION

1. Field of the Invention

The invention relates to the technical field of communication, and more particularly, to a modulator, a demodulator and a wireless communication system.

2. Description of the Related Art

Recent years have witnessed a rapid development of the wireless communication technology around the world, and the wireless communication technology has been a global focus in the field of IT and communication. In recent years, with the development of Internet of Things, construction of Internet of Things is now being fully rolled around the world. There is an increasing demand for the wireless communication technology in the market.

In the field of wireless communication technology, the transmission rate of a communication system continues to increase. The fourth-generation mobile communication technology (4G) provides us with the opportunity to move into a new era of mobile internet. Now we are bracing the fifth-generation mobile technology (5G) featuring high frequency and high speed. Theoretically, 5G is designed to deliver peak data transmission rates up to dozens of Gbps, which is 100 times faster than a previous network technology. However, in some cases, it is not necessary to have high data rates, instead, larger coverage areas and lower power consumption are needed.

When designing the physical layer of the conventional Bluetooth BLE technology, Gauss Frequency Shift Keying (GFSK) is incorporated therein for signal modulation. The use of such technology reduces the complexity involved in the designing process and allows the power consumption of communication chips to be lowered. However, it has some disadvantages that the transmission range is relatively small, that is, it is limited to a range from a few meters to tens of meters. Direct sequence spread spectrum is known and can deliver a high coding gain, and it is designed to be better resistant to noise. In addition, signal transmission over long distance is achieved. However, the use of the terminal of the direct sequence spread spectrum requires relatively higher power consumption.

SUMMARY OF THE INVENTION

An object of exemplary embodiments of the invention is to achieve long-distance signal transmission while reducing power consumption.

For the above-mentioned object, a modulator is provided in embodiments of the present invention, wherein the modulator is suitable for generating a target linear frequency modulation signal, wherein the target linear frequency modulation signal is a signal of which the frequency is varied linearly over time, wherein the phase of the target linear frequency modulation signal is determined by an initial frequency and a frequency stepping of the target linear frequency modulation signal, and the frequency stepping is determined by the bandwidth of the target linear frequency modulation signal and the spreading factor of the target linear frequency modulation signal.

Optionally, the modulator comprises a digital modulation circuit, wherein the digital modulation circuit is suitable for generating a control signal of the target linear frequency modulation signal; the target linear frequency modulation signal is given by $$s(t) = \sin(2\pi \times f(t) \times t), \, f(t) = f_c + \left(f_{start} + \frac{f_{step}}{2}\right) + \frac{f_{step}}{2}t,$$

the digital baseband signal is given by $$s(n) = \sin\left(\frac{2\pi}{BW} \times f(n) \times n\right), \, f(n) = \left(f_{start} + \frac{f_{step}}{2}\right) + \frac{f_{step}}{2}n,$$

wherein $1 \leq n \leq 2^{SF}$, SF is the spreading factor; the phase of the digital baseband signal at point m is calculated as $$\theta_m = \theta_0 + \frac{2\pi}{BW} \times \sum_{n=1}^{m} (f_{start} + f_{step} \times n);$$

wherein $f_c$ is the radio frequency, $f_{start}$ is the initial frequency of the target linear frequency modulation signal, $f_{step}$ is the frequency stepping of the target linear frequency modulation signal, the control signal is determined by f(n); $\theta_m$ is the phase of the digital baseband signal at the point m, BW is the bandwidth of the digital baseband signal, and $\theta_0$ is an initial phase of the digital baseband signal.

Optionally, the modulator comprises a radio frequency analog modulation circuit coupled to the digital modulation circuit; the radio frequency analog modulation circuit comprises a Phase-Locked Loop (PLL) circuit; the digital modulation circuit is configured to output the control signal to the PLL circuit, to control the PLL circuit to generate the target linear frequency modulation signal.

Optionally, a range of values of the initial frequency of the target linear frequency modulation signal is associated with a bandwidth of a transmitted signal.

Optionally, to obtain the frequency stepping, the bandwidth of the target linear frequency modulation signal is divided by the length of time of the target linear frequency modulation signal; the length of time of the target linear frequency modulation signal is determined by the spreading factor of the target linear frequency modulation signal.

Optionally, the target linear frequency modulation signal comprises a first target linear frequency modulation signal and a second target linear frequency modulation signal, wherein the frequency of the first target linear frequency modulation signal increases linearly over time, and the frequency of the second target linear frequency modulation signal decreases linearly over time.

The invention further comprises a demodulator, configured to receive the target linear frequency modulation signal emitted by the above-mentioned modulator, and configured to demodulate the target linear frequency modulation signal; the demodulator comprises:

a synchronous buffer, configured to store the $i^{th}$ sampled signal of a preset length, wherein the preset length is determined by the spreading factor of the target linear frequency modulation signal;

a processor, coupled to the synchronous buffer, wherein the processor is configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation; the $i^{th}$ local linear frequency modulation signal is adjusted by the first frequency modulation value and the residual fractional frequency deviation accumulative value corresponding to the $i^{th}$ sampled signal; the $i^{th}$ sampled signal is multiplied by the conjugate signal of the adjusted $i^{th}$ local linear frequency modulation signal to obtain a second product, the second product is subjected to second discrete fourier transform to obtain a second frequency modulation value and a second residual fractional frequency deviation; the second residual fractional frequency deviation is added to the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal; the first frequency modulation value and the second frequency modulation value are output to an adder, respectively; $1 \leq i \leq N$, N is the number of the sampled signal, and N is calculated as the quotient of the total length of the target linear frequency modulation signal and the preset length;

the adder, configured to add the first frequency modulation value and the second frequency modulation value to obtain a sum, wherein the sum is adopted as modulation information of the target linear frequency modulation signal.

Optionally, the processor is further configured to output the first frequency modulation value to the synchronous buffer to control the synchronous buffer to adjust read-write address.

Optionally, the processor comprises a discrete fourier transform unit, configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation; the first frequency modulation value is output to a local linear frequency modulation signal generation unit; $i^{th}$ sampled signal is multiplied by the conjugate signal of the adjusted $i^{th}$ local linear frequency modulation signal output from the local linear frequency modulation signal generation unit to obtain a second product, the second product is subjected to second discrete fourier transform to obtain a second frequency modulation value and a second residual fractional frequency deviation; the first frequency modulation value and the second frequency modulation value are output the adder, respectively; the second residual fractional frequency deviation is output to an accumulator;

the local linear frequency modulation signal generation unit, configured to adjust the $i^{th}$ local linear frequency modulation signal based on the first frequency modulation value and the residual fractional frequency deviation accumulative value corresponding to the $i^{th}$ sampled signal, and configured to output the adjusted $i^{th}$ local linear frequency modulation signal to the discrete fourier transform unit;

the accumulator, configured to add the second residual fractional frequency deviation and the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal.

Optionally, the discrete fourier transform unit is configured to calculate the first residual fractional frequency deviation using the following formula $$\text{frac\_freq}_1 = \frac{|\text{right\_bin}_1 - \text{left\_bin}_1|}{|\text{max\_val}_1|};$$

wherein $\text{frac\_freq}_1$ is the first residual fractional frequency deviation, $\text{max\_val}_1$ is the maximum value in the first discrete fourier transform, $\text{right\_bin}_1$ is the result obtained from the discrete fourier transform at a position adjacent to the right side of $\text{max\_val}_1$, and $\text{left\_bin}_1$ is the result obtained from the discrete fourier transform at a position adjacent to the left side of $\text{max\_val}_1$.

Optionally, the discrete fourier transform unit is configured to calculate the second residual fractional frequency deviation using the following formula $$\text{frac\_freq}_2 = \frac{|\text{right\_bin}_2 - \text{left\_bin}_2|}{|\text{max\_val}_2|};$$

wherein $\text{frac\_freq}_2$ is the second residual fractional frequency deviation, $\text{max\_val}_2$ is the maximum value in the second discrete fourier transform, $\text{right\_bin}_2$ is the result obtained from the discrete fourier transform at a position adjacent to the right side of $\text{max\_val}_2$, and $\text{left\_bin}_2$ is the result obtained from the discrete fourier transform at a position adjacent to the left side of $\text{max\_val}_2$.

Optionally, the processor further comprises a first frequency mixer, the first frequency mixer is configured for frequency mixing an output of the synchronous buffer and an output of the local linear frequency modulation signal, and a result from the frequency mixing is output to the discrete fourier transform unit.

Optionally, the demodulator further comprises a second frequency mixer and a digital low-pass filter, wherein the second frequency mixer is configured to remove intermediate frequency from the target linear frequency modulation signal output by a radio frequency circuit and to remove an integer frequency deviation from the target linear frequency modulation signal output by a radio frequency circuit, and the processed target linear frequency modulation signal is output to the digital low-pass filter;

the digital low-pass filter is configured to filter the processed target linear frequency modulation signal, and the filtered target linear frequency modulation signal is output to the synchronous buffer.

A wireless communication system is further provided in the embodiments of the invention, wherein the wireless communication system comprises the modulator and the demodulator as described above.

When comparing with the prior art, the present invention has the following beneficial effects:

a target linear frequency modulation signal is generated by using a modulator, and the target linear frequency modulation signal is demodulated by a demodulator. In the wireless communication system, due to the use of the target linear frequency modulation signal, power consumption can be reduced while long-distance signal transmission is realized.

DETAILED DESCRIPTION

In the prior art, direct sequence spread spectrum technique is known and can deliver a high coding gain, and it is designed to be better resistant to noise. In addition, signal transmission over long distance is achieved. For example, Global Positioning System (GPS) uses direct sequence spread spectrum technique, through which it is better resistant to noise and signal transmission over long distance is also achieved. However, the terminal of GPS requires higher power consumption.

In an embodiment of the present invention, a target linear frequency modulation signal is generated by using a modulator, and the target linear frequency modulation signal is demodulated by a demodulator. In the wireless communication system, due to the use of the target linear frequency modulation signal, spread spectrum gain of the target linear frequency modulation signal is obtained, and the transmission distance is increased at the same power consumption. Therefore, long-distance signal transmission is realized without increasing the power consumption of the system.

In order to make the above-mentioned objects, features and advantageous effects become more apparent, certain exemplary embodiments according to the present disclosure will be described with reference to the accompanying drawings.

Figure 1:
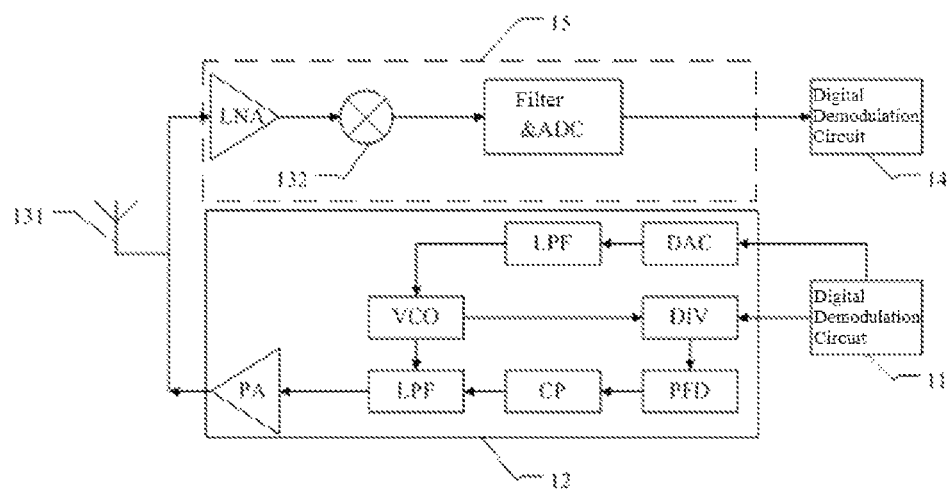
FIG. 1 is a schematic diagram of a structure of a wireless communication terminal according to an embodiment of the present invention.

With reference to FIG. 1, the invention provides a wireless communication system comprising a modulator and a demodulator. The modulator and the demodulator will be described in more details hereinafter.

In a specific embodiment, the modulator is suitable for generating a target linear frequency modulation signal. In an embodiment of the present invention, the target linear frequency modulation signal is a signal of which the frequency is varied linearly over time, wherein the phase of the target linear frequency modulation signal is determined by an initial frequency and a frequency stepping of the target linear frequency modulation signal, and the frequency stepping is determined by the bandwidth of the target linear frequency modulation signal and the spreading factor of the target linear frequency modulation signal.

In a specific embodiment, the modulator may comprise a digital modulation circuit 11 and a radio frequency analog modulation circuit 12. The digital modulation circuit 11 may be configured to generate a control signal corresponding to the target linear frequency modulation signal, and to output the control signal to the radio frequency analog modulation circuit 12. The control signal may be further processed by the radio frequency analog modulation circuit 12 for generating the target linear frequency modulation signal.

In a specific embodiment, the initial frequency of the target linear frequency modulation signal is determined by a bandwidth of a transmitted signal. In an embodiment of the present invention, values of the initial frequency of the target linear frequency modulation signal may be in a range of f/2 to −f/2, wherein f is the bandwidth of the transmitted signal.

In a specific embodiment, the spreading factor of the target linear frequency modulation signal is predetermined depending on the requirements. The spreading factor of the target linear frequency modulation signal help the determination of the duration of the target linear frequency modulation signal in time domain, that is, a time window is determined based on the spreading factor of the target linear frequency modulation signal, the length of time of the time window is $\Delta t$. At the initial moment of the time window, the frequency of the target linear frequency modulation signal is the initial frequency of the target linear frequency modulation signal; and at the termination moment of the time window, the frequency of the target linear frequency modulation signal is an end frequency of the target linear frequency modulation signal.

A frequency difference of the target linear frequency modulation signal in the time window can be determined based on the initial frequency of the target linear frequency modulation signal and the end frequency of the target linear frequency modulation signal, that is, the frequency difference is expressed as $\Delta f = f_{end} - f_{start}$, $\Delta f$ is the frequency difference of the target linear frequency modulation signal in the time window, $f_{end}$ is the end frequency of the target linear frequency modulation signal, $f_{start}$ is the start frequency of the target linear frequency modulation signal.

Based on the length of time $\Delta t$ corresponding to the spreading factor of the target linear frequency modulation signal, the frequency difference $\Delta f$ of the target linear frequency modulation signal in the time window, the frequency stepping can be calculated as $f_{step} = \Delta f / \Delta t$. The frequency of the target linear frequency modulation signal varies linearly in the time window can be determined based on $f_{start}$, $f_{end}$, and $f_{step}$.

In a specific embodiment, the digital modulation circuit may be suitable for generating a control signal of the target linear frequency modulation signal. In an embodiment of the invention, the generated target linear frequency modulation signal is given by $s(t) = \sin(2\pi \times f(t) \times t)$, wherein $$f(t) = f_c + \left(f_{start} + \frac{f_{step}}{2}\right) + \frac{f_{step}}{2} t,$$

$f_c$ is the radio frequency, that is, the transmitted frequency of the signal; the digital baseband signal is given by $$s(n) = \sin\left(\frac{2\pi}{BW} \times f(n) \times n\right),$$

$$f(n) = \left(f_{start} + \frac{f_{step}}{2}\right) + \frac{f_{step}}{2} n,$$

wherein $1 \leq n \leq 2^{SF}$, SF is the spreading factor; and the control signal is determined by $f(n)$.

In a specific embodiment, the transmitted frequency of the signal is 433 MHz, that is, the value of fc is 433 MHz. It should be understood that the transmitted frequency of the signal may be different in different applications.

In a specific embodiment, n is a discrete time point, and t is a continuous period of time. Therefore, $f(n)$ essentially corresponds to $f(t)$ at a discrete time.

In an embodiment of the invention, the frequency of the target linear frequency modulation signal varies over time, that is, $$f(t) = f_c + \left(f_{start} + \frac{f_{step}}{2}\right) + \frac{f_{step}}{2} t.$$

In an embodiment of the invention, for a discrete data signal system, $t = n/BW$. Therefore, the phase of the digital baseband signal at point m is calculated as $$\theta_m = \theta_0 + \frac{2\pi}{BW} \times \sum_{n=1}^{m} (f_{start} + f_{step} \times n),$$

$\theta_m$ is the phase of the digital baseband signal at the point m, $f_{start}$ is the start frequency of the target linear frequency modulation signal, BW is the bandwidth of the digital baseband signal, and $\theta_0$ is an initial phase of the digital baseband signal; $1 \leq m \leq M$, M is the total number of points in the target linear frequency modulation signal, and $M=2^{SF}$, SF is the value of the spreading factor. For example, if SF=6, M=64.

In an embodiment of the invention, the sampling frequency of the discrete data signal system is equal to the bandwidth of the digital baseband signal.

That is to say, in an embodiment of the invention, the phase of the generated target linear frequency modulation signal is associated with the frequency, a phase corresponding to a certain point is associated with an accumulative value of the frequencies at previous points and the initial frequency of the target linear frequency modulation signal.

In a specific embodiment, the modulator may generate two paths of target linear frequency modulation signals, namely, a first path of target linear frequency modulation signal and a second path of target linear frequency modulation signal. The frequency of the first path of target linear frequency modulation signal increases linearly in the frequency stepping in the time window, and the frequency of the second path of target linear frequency modulation signal decreases linearly in the frequency stepping in the time window.

In an embodiment of the invention, an initial frequency of the first path of target linear frequency modulation signal may be −f/2, an end frequency thereof may be f/2; an initial frequency of the second path of target linear frequency modulation signal may be f/2, an end frequency thereof may be −f/2.

In a specific embodiment, the radio frequency analog modulation circuit 12 may be coupled to the digital modulation circuit 11. The radio frequency analog modulation circuit 12 may comprise a Phase-Locked Loop (PLL) circuit. The digital modulation circuit 11 may be coupled to the PLL circuit. After generating the control signal, the digital modulation circuit 11 may output the control signal to the PLL circuit. A voltage-controlled oscillator (VCO) in the PLL circuit is controlled through the control signal, so as to generate a target linear frequency modulation signal in which the frequency is varied over time; a frequency divider is controlled through the control signal, so as to generate a frequency division value corresponding to the target linear frequency modulation signal output by the VCO.

In an embodiment of the invention, the control signal generated by the digital modulation circuit 11 may be a digital signal, and the control signal in digital signal format can be converted into a corresponding control signal in analog signal format through a digital-to-analog converter (DAC). The control signal in analog signal format controls the VCO.

Figure 2:
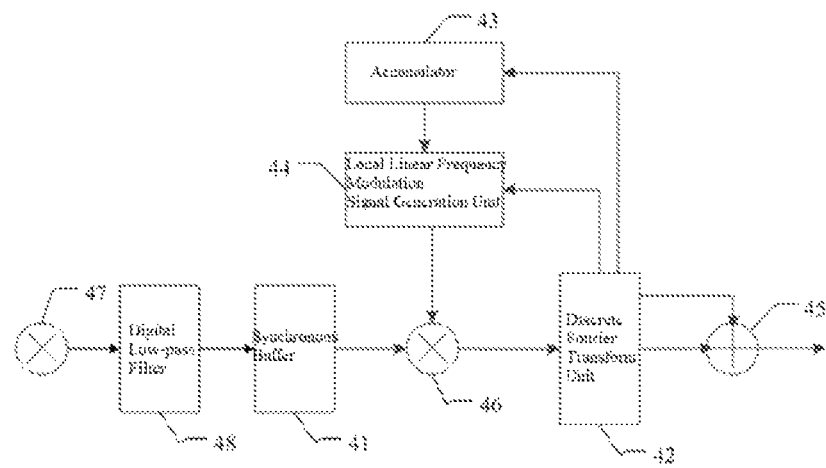
FIG. 2 is a schematic diagram of a structure of a demodulator according to an embodiment of the present invention.

FIG. 2 shows a schematic diagram of a structure of a demodulator according to an embodiment of the present invention. In an embodiment of the present invention, the demodulator may comprise a digital demodulation circuit 14 and an analog demodulation circuit 15. The analog demodulation circuit 15 may comprise an antenna circuit (LNA), a mixer 132, a filter & analog-to-digital converter (ADC), and so on. The received signal is amplified by the antenna circuit (LNA), the mixer 132 performs down-conversion processing on the signal, and the filter & analog-to-digital converter (ADC) performs filtering processing on the input signal. Since the received signal is an analog signal, it is also necessary to perform analog-to-digital conversion on the received signal through an analog-to-digital converter (ADC) to obtain a digital signal and output the digital signal to the digital demodulation circuit 14.

In a specific embodiment, structures and functions of the analog demodulation circuit 15 may refer to the part of the analog demodulation circuit in the existing radio frequency circuit.

In an embodiment of the invention, in order to solve the problem that the there exists a sampling deviation between clocks of the transmitting end of the radio frequency circuit and the receiving end of the radio frequency circuit, the target linear frequency modulation signal may be reconstructed. By means of polynomial interpolation, a set of polynomials and a plurality of input data are used to determine the value of a sampling point, and a newly constructed digital signal is used to replace the original digital signal, which can compensate the existing sampling deviation. In other words, the digital demodulation circuit can reconstruct the received target linear frequency modulation signal in advance to eliminate the sampling deviation.

In a specific embodiment, in order to demodulate the target linear frequency modulation signal, a local linear frequency modulation signal can be generated locally. In a time window defined by the spreading factor corresponding to the target linear frequency modulation signal, a linearly changing frequency is generated, and the phase is obtained by accumulating the frequency. The process for generating the local linear frequency modulation signal may refer to the process for the generation of the target linear frequency modulation signal provided in the above-mentioned embodiment in the present invention.

In order to correctly demodulate the target linear frequency modulation signal, it is necessary to synchronize the target linear frequency modulation signal.

In a specific embodiment, the digital demodulation circuit 14 may comprise a synchronous buffer 21, a processor, and an adder 25.

In a specific embodiment, the length of the sampled signal that can be stored in the synchronous buffer 21 can be determined based on the number of sampling points corresponding to the spreading factor. The sampled signal essentially refers to a part of the target linear frequency modulation signal, that is, the target linear frequency modulation signal is equally divided into N sampled signals, which are input into the synchronous buffer 21 in sequence.

When the length of the sampled signal input into the synchronous buffer 21 reaches a preset length, the processor can take out the sampled signals from the synchronous buffer 21 and process the sampled signals. The processor can perform the same processing on each sampled signal in sequence. Processing of the $i^{th}$ sampled signal by the processor is illustrated below, $1 \leq i \leq N$, N is the number of the sampled signal, and N is calculated as the quotient of the total length of the target linear frequency modulation signal and the preset length.

In a specific embodiment, the processor may be configured to multiple the $i^{th}$ sampled signal by a conjugate signal of the $i^{th}$ local linear frequency modulation signal to obtain a first product. The first product is subjected to first discrete fourier transform by the processor, to obtain a first frequency modulation value and a first residual fractional frequency deviation from the result of the first discrete fourier transform. The $i^{th}$ local linear frequency modulation signal is adjusted based on the first frequency modulation value and the residual fractional frequency deviation accumulative value corresponding to the $i^{th}$ sampled signal. Then $i^{th}$ sampled signal is multiplied by the conjugate signal of the adjusted $i^{th}$ local linear frequency modulation signal to obtain a second product. The second product is subjected to second discrete fourier transform by the processor, to obtain a second frequency modulation value and a second residual fractional frequency deviation from the result of the second discrete fourier transform. The second residual fractional frequency deviation and the residual fractional frequency deviation accumulative value corresponding to the $i^{th}$ sampled signal is added to obtain a sum, and the sum is considered as a residual fractional frequency deviation accumulative value corresponding to the $(i+1)^{th}$ sampled signal. The processor outputs the first frequency modulation value and the second frequency modulation value to the adder 25, respectively. Get a sum of the first frequency modulation value and the second frequency modulation value by the adder 25. The obtained sum is considered as modulation information corresponding to the target linear frequency modulation signal.

In a specific embodiment, after completing the first discrete fourier transform, the processor can also output the first modulation frequency value to the synchronous buffer 21 to control the synchronous buffer 21 to adjust read-write address, so that local linear frequency modulation signal is always synchronized with the target linear frequency modulation signal.

In a specific embodiment, the processor may comprise: a discrete fourier transform unit 22, a local linear frequency modulation signal generation unit 24, and an accumulator 23.

In a specific implementation, the discrete fourier transform unit 22 may read the $i^{th}$ sampled signal from the synchronous buffer 21, and to multiple the $i^{th}$ sampled signal by a conjugate signal of the $i^{th}$ local linear frequency modulation signal to obtain a first product; the first product is subjected to first discrete fourier transform to obtain a first frequency modulation value and a first residual fractional frequency deviation; the first frequency modulation value is output to the local linear frequency modulation signal generation unit 24; the $i^{th}$ sampled signal is multiplied by the conjugate signal of the adjusted $i^{th}$ local linear frequency modulation signal output from the local linear frequency modulation signal generation unit 24 to obtain a second product; the second product is subjected to second discrete fourier transform to obtain a second frequency modulation value and a second residual fractional frequency deviation; the first frequency modulation value and the second frequency modulation value are output the adder 25, respectively; the second residual fractional frequency deviation is output to the accumulator 23.

After receiving the first modulation frequency value and the residual fractional frequency deviation accumulative value corresponding to the $i^{th}$ sampled signal, the local linear frequency modulation signal generation unit 24 adjusts the frequency of the $i^{th}$ local linear frequency modulation signal, and the adjusted $i^{th}$ local linear frequency modulation signal is output to the discrete fourier transform unit 22.

The accumulator 23 may be configured to add the second residual fractional frequency deviation and the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal.

The process of calculating the first residual fractional frequency deviation and the first modulation frequency value by the discrete fourier transform unit 22 will be described below.

In a specific embodiment, after the discrete fourier transform unit 22 has calculated to obtain a first discrete fourier transform result, it can select the maximum value and the number of its position from the first discrete fourier transform result, and obtain the discrete fourier transform results of adjacent positions on the left and right sides of the maximum value. According to the maximum value in the first discrete fourier transform, the discrete fourier transform result of the adjacent position on the left and the discrete fourier transform result of the adjacent position on the right, the first residual fractional frequency deviation is calculated by using the following formula $$\text{frac\_freq}_1 = \frac{|\text{right\_bin}_1 - \text{left\_bin}_1|}{|\text{max\_val}_1|}; \quad (1)$$

wherein $\text{frac\_freq}_1$ is the first residual fractional frequency deviation, $\text{max\_val}_1$ maximum value in the first discrete fourier transform, $\text{right\_bin}_1$ is the result obtained from the discrete fourier transform at a position adjacent to the right side of $\text{max\_val}_1$, and $\text{left\_bin}_1$ is the result obtained from the discrete fourier transform at a position adjacent to the left side of $\text{max\_val}_1$.

In an embodiment of the invention, the maximum value in the first discrete fourier transform is the value of the first modulation frequency.

The initial frequency of the $i^{th}$ local linear frequency modulation signal is adjusted based on the residual fractional frequency deviation accumulative value corresponding to the $i^{th}$ sampled signal and the first frequency modulation value ($\text{max\_val}_1$) corresponding to the $i^{th}$ sampled signal, to obtain the adjusted $i^{th}$ local linear frequency modulation signal.

The $i^{th}$ sampled signal is multiplied by the conjugate signal of the adjusted $i^{th}$ local linear frequency modulation signal to obtain a second product. The second product is subjected to the second discrete fourier transform to obtain a second discrete fourier transform result. The second discrete fourier transform result comprises a second frequency modulation value and a second residual fractional frequency deviation accumulative value.

The process of calculating the second residual fractional frequency deviation and the second modulation frequency value by the discrete fourier transform unit 22 will be described below.

Select the maximum value and the number of its position from the second discrete fourier transform result, and obtain the discrete fourier transform results of adjacent positions on the left and right sides of the maximum value. According to the maximum value in the second discrete fourier transform, the discrete fourier transform result of the adjacent position on the left and the discrete fourier transform result of the adjacent position on the right, the second residual fractional frequency deviation is calculated by using the following formula (2)

$$\text{frac\_freq}_2 = \frac{|\text{right\_bin}_2 - \text{left\_bin}_2|}{|\text{max\_val}_2|}; \quad (2)$$

wherein $\text{frac\_freq}_2$ is the second residual fractional frequency deviation, $\text{max\_val}_2$ maximum value in the second discrete fourier transform, $\text{right\_bin}_2$ is the result obtained from the discrete fourier transform at a position adjacent to the right side of max_val$_2$, and left_bin$_2$ is the result obtained from the discrete fourier transform at a position adjacent to the left side of max_val$_2$.

In an embodiment of the invention, the maximum value in the second discrete fourier transform is the value of the second modulation frequency.

The second residual fractional frequency deviation is added to the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal.

It can be seen that the residual fractional frequency deviation accumulative value corresponding to the $i^{th}$ sampled signal is the sum of the second residual fractional frequency deviations corresponding to the previous $(i-1)^{th}$ sampled signals.

In a specific embodiment, the digital modulation circuit 14 comprises an adder 25. The adder 25 is configured to add the first frequency modulation value and the second frequency modulation value to obtain a sum, wherein the sum is adopted as modulation information of the target linear frequency modulation signal.

In a specific embodiment, the digital demodulation circuit 14 further comprises a first frequency mixer 26. A first input end of the first frequency mixer 26 is coupled to an output end of the synchronous buffer 21, a second input end of the first frequency mixer 26 is coupled to an output end of the local linear frequency modulation signal generation unit 24, and an output end of the first frequency mixer 26 is coupled to the input end of the discrete fourier transform unit 22. It can be seen from the above-mentioned embodiment that the frequency stored in the synchronous buffer 21 is essentially a part of the target linear frequency modulation signal, that is, a sampled signal. Therefore, the first frequency mixer 26 is configured for frequency mixing the input local linear frequency modulation signal and the input sampled signal, and the result from the mixing process is output to the discrete fourier transform unit 22.

In a specific embodiment, when performing the first discrete fourier transform, the obtained first residual fractional frequency deviation is not input into the accumulator 23, that is, the first residual fractional frequency deviation is not included in the fractional frequency deviation cumulative value. When performing the second discrete fourier transform, the obtained second residual fractional frequency deviation is input into the accumulator 23, that is, the second residual fractional frequency deviation needs to be included in the fractional frequency deviation cumulative value.

In a specific embodiment, the digital demodulation circuit 14 further comprises a second frequency mixer 27. The second frequency mixer 27 is configured to remove intermediate frequency from the received target linear frequency modulation signal and to remove an integer frequency deviation from the target linear frequency modulation signal by performing removal of intermediate frequency and by taking a value of an integer frequency deviation on the received target linear frequency modulation signal.

It can be seen from the above-mentioned embodiment of the present invention, the modulator may generate two paths of target linear frequency modulation signals. When demodulating the signal, the digital demodulation circuit can calculate the integer frequency deviation in the signal, and input the calculated integer frequency deviation into the second frequency mixer. The second frequency mixer performs frequency mixing processing on the received target linear frequency modulation signal, thereby removing the integer frequency deviation and the intermediate frequency components in the target linear frequency modulation signal.

The digital demodulation circuit 14 may further comprise a digital low-pass filter 28, and the second frequency mixer 27 outputs the processed target linear frequency modulation signal to the digital low-pass filter. The digital low-pass filter 28 performs filtering processing on the processed target linear frequency modulation signal. The bandwidth of the digital low-pass filter 28 can be determined by the spectrum occupation width of the target linear frequency modulation signal. The output end of the digital low-pass filter is connected to the synchronous buffer 21, and the target linear frequency modulation signal, which is subjected to the filtering process and is output by the digital low-pass filter, is input into the synchronous buffer 21.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A modulator, wherein the modulator is suitable for generating a target linear frequency modulation signal, wherein the target linear frequency modulation signal is a signal of which the frequency is varied linearly over time, wherein the phase of the target linear frequency modulation signal is determined by an initial frequency and a frequency stepping of the target linear frequency modulation signal, and the frequency stepping is determined by the bandwidth of the target linear frequency modulation signal and the spreading factor of the target linear frequency modulation signal;

the modulator comprises a digital modulation circuit, wherein the digital modulation circuit is suitable for generating a control signal of the target linear frequency modulation signal; the target linear frequency modulation signal is given by $$s(t) = \sin(2\pi \times f(t) \times t),$$

$$f(t) = f_c + \left(f_{start} + \frac{f_{step}}{2}\right) + \frac{f_{step}}{2}t,$$

the digital baseband signal is given by $$s(n) = \sin\left(\frac{2\pi}{BW} \times f(n) \times n\right),$$

$$f(n) = \left(f_{start} + \frac{f_{step}}{2}\right) + \frac{f_{step}}{2}n,$$

wherein $1 \leq n \leq 2^{SF}$, SF is the spreading factor; the phase of the digital baseband signal at point m is calculated as $$\theta_m = \theta_0 + \frac{2\pi}{BW} \times \sum_{n=1}^{m}(f_{start} + f_{step} \times n);$$

wherein $f_c$ is the radio frequency, $f_{start}$ is the initial frequency of the target linear frequency modulation signal, $f_{step}$ is the frequency stepping of the target linear frequency modulation signal, the control signal is determined by f(n); $\theta_m$ is the phase of the digital baseband signal at the point m, BW is the bandwidth of the digital baseband signal, and $\theta_0$ is an initial phase of the digital baseband signal.

2. The modulator of claim 1, wherein the modulator comprises a radio frequency analog modulation circuit coupled to the digital modulation circuit; the radio frequency analog modulation circuit comprises a Phase-Locked Loop (PLL) circuit; the digital modulation circuit is configured to output the control signal to the PLL circuit, to control the PLL circuit to generate the target linear frequency modulation signal.

3. The modulator of claims 1, wherein a range of values of the initial frequency of the target linear frequency modulation signal is associated with a bandwidth of a transmitted signal.

4. The modulator of claim 1, wherein to obtain the frequency stepping, the bandwidth of the target linear frequency modulation signal is divided by the length of time of the target linear frequency modulation signal; the length of time of the target linear frequency modulation signal is determined by the spreading factor of the target linear frequency modulation signal.

5. The modulator of claim 1, wherein the target linear frequency modulation signal comprises a first target linear frequency modulation signal and a second target linear frequency modulation signal, wherein the first target linear frequency modulation signal increases linearly over time, and the second target linear frequency modulation signal decreases linearly over time.

6. A demodulator, configured to receive the target linear frequency modulation signal emitted by the modulator of claim 1, and configured to demodulate the target linear frequency modulation signal; the demodulator comprises:
a synchronous buffer, configured to store the $i^{th}$ sampled signal of a preset length, the preset length be determined by the spreading factor of the target linear frequency modulation signal;
a processor, coupled to the synchronous buffer, wherein the processor is configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation, by the first frequency modulation value and a residual fractional frequency deviation accumulative value corresponding to the $i^{th}$ sampled signal, the $i^{th}$ local linear frequency modulation signal is adjusted; $i^{th}$ sampled signal is multiplied by the conjugate signal of the adjusted $i^{th}$ local linear frequency modulation signal to obtain a second product, the second product is subjected to second discrete fourier transform to obtain a second frequency modulation value and a second residual fractional frequency deviation; the second residual fractional frequency deviation is added to the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal; the first frequency modulation value and the second frequency modulation value are output to an adder respectively; $1 \leq i \leq N$, N is the number of the sampled signal, and N is calculated as the quotient of the total length of the target linear frequency modulation signal and the preset length;
the adder, configured to add the first frequency modulation value and the second frequency modulation value to obtain a sum, wherein the sum is adopted as modulation information of the target linear frequency modulation signal.

7. The demodulator of claim 6, wherein the processor is further configured to output the first frequency modulation value to the synchronous buffer to control the synchronous buffer to adjust read-write address.

8. The demodulator of claim 7, wherein the processor comprises:
a discrete fourier transform unit, configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation; the first frequency modulation value is output to a local linear frequency modulation signal generation unit; $i^{th}$ sampled signal is multiplied by the conjugate signal of the adjusted $i^{th}$ local linear frequency modulation signal output from the local linear frequency modulation signal generation unit to obtain a second product, the second product is subjected to second discrete fourier transform to obtain a second frequency modulation value and a second residual fractional frequency deviation; the first frequency modulation value and the second frequency modulation value are output the adder, respectively; the second residual fractional frequency deviation is output to an accumulator;
the local linear frequency modulation signal generation unit, configured to adjust the $i^{th}$ local linear frequency modulation signal based on the first frequency modulation value and the residual fractional frequency deviation accumulative value corresponding to the $i^{th}$ sampled signal, and configured to output the adjusted $i^{th}$ local linear frequency modulation signal to the discrete fourier transform unit;
the accumulator, configured to add the second residual fractional frequency deviation and the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal.

9. The demodulator of claim 8, wherein the discrete fourier transform unit is configured to calculate the first residual fractional frequency deviation using the following formula $$\text{frac\_freq}_1 = \frac{|\text{right\_bin}_1 - \text{left\_bin}_1|}{|\text{max\_val}_1|};$$

wherein $\text{frac\_freq}_1$ is the first residual fractional frequency deviation, $\text{max\_val}_1$ is the maximum value in the first discrete fourier transform, $\text{right\_bin}_1$ is the result obtained from the discrete fourier transform at a position adjacent to the right side of $\text{max\_val}_1$, and $\text{left\_bin}_1$ is the result obtained from the discrete fourier transform at a position adjacent to the left side of $\text{max\_val}_1$.

10. The demodulator of claim 8, wherein the discrete fourier transform unit is configured to calculate the second residual fractional frequency deviation using the following formula $$\text{frac\_freq}_2 = \frac{|\text{right\_bin}_2 - \text{left\_bin}_2|}{|\text{max\_val}_2|};$$

wherein frac_freq$_2$ is the second residual fractional frequency deviation, max_val$_2$ is the maximum value in the second discrete fourier transform, right_bin$_2$ is the result obtained from the discrete fourier transform at a position adjacent to the right side of max_val$_2$, and left_bin$_2$ is the result obtained from the discrete fourier transform at a position adjacent to the left side of max_val$_2$.

11. The demodulator of claim 8, wherein the processor further comprises a first frequency mixer, the first frequency mixer is configured for frequency mixing an output of the synchronous buffer and an output of the local linear frequency modulation signal, and a result from the frequency mixing is output to the discrete fourier transform unit.

12. The demodulator of claim 6, further comprising a second frequency mixer and a digital low-pass filter, wherein the second frequency mixer is configured to remove intermediate frequency from the target linear frequency modulation signal output by a radio frequency circuit and to remove an integer frequency deviation from the target linear frequency modulation signal output by a radio frequency circuit, and the processed target linear frequency modulation signal is output to the digital low-pass filter;

the digital low-pass filter is configured to filter the processed target linear frequency modulation signal, and the filtered target linear frequency modulation signal is output to the synchronous buffer.

13. A wireless communication system comprising a modulator and a demodulator the modulator is suitable for generating a target linear frequency modulation signal, wherein the target linear frequency modulation signal is a signal of which the frequency is varied linearly over time, wherein the phase of the target linear frequency modulation signal is determined by an initial frequency and a frequency stepping of the target linear frequency modulation signal, and the frequency stepping is determined by the bandwidth of the target linear frequency modulation signal and the spreading factor of the target linear frequency modulation signal;

the modulator comprises a digital modulation circuit, wherein the digital modulation circuit is suitable for generating a control signal of the target linear frequency modulation signal; the target linear frequency modulation signal is given by $$s(t) = \sin(2\pi \times f(t) \times t),$$

$$f(t) = f_c + \left(f_{start} + \frac{f_{step}}{2}\right) + \frac{f_{step}}{2}t,$$

the digital baseband signal is given by $$s(n) = \sin\left(\frac{2\pi}{BW} \times f(n) \times n\right),$$

$$f(n) = \left(f_{start} + \frac{f_{step}}{2}\right) + \frac{f_{step}}{2}n,$$

wherein $1 \leq n \leq 2^{SF}$, SF is the spreading factor; the phase of the digital baseband signal at point m is calculated as $$\theta_m = \theta_0 + \frac{2\pi}{BW} \times \sum_{n=1}^{m} (f_{start} + f_{step} \times n);$$

wherein $f_c$ is the radio frequency, $f_{start}$ is the initial frequency of the target linear frequency modulation signal, $f_{step}$ is the frequency stepping of the target linear frequency modulation signal, the control signal is determined by f(n); $\theta_m$ is the phase of the digital baseband signal at the point m, BW is the bandwidth of the digital baseband signal, and $\theta_0$ is an initial phase of the digital baseband signal;

the demodulator is configured to receive the target linear frequency modulation signal emitted by the modulator, and is configured to demodulate the target linear frequency modulation signal; the demodulator comprises:

a synchronous buffer, configured to store the $i^{th}$ sampled signal of a preset length, the preset length be determined by the spreading factor of the target linear frequency modulation signal;

a processor, coupled to the synchronous buffer, wherein the processor is configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation, by the first frequency modulation value and a residual fractional frequency deviation accumulative value corresponding to $i^{th}$ sampled signal, the $i^{th}$ local linear frequency modulation signal is adjusted; $i^{th}$ sampled signal is multiplied by the conjugate signal of the adjusted $i^{th}$ local linear frequency modulation signal to obtain a second product, the second product is subjected to second discrete fourier transform to obtain a second frequency modulation value and a second residual fractional frequency deviation; the second residual fractional frequency deviation is added to the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal; the first frequency modulation value and the second frequency modulation value are output to an adder respectively; $1 \leq i \leq N$, N is the number of the sampled signal, and N is calculated as the quotient of the total length of the target linear frequency modulation signal and the preset length; and the adder, configured to add the first frequency modulation value and the second frequency modulation value to obtain a sum, wherein the sum is adopted as modulation information of the target linear frequency modulation signal.

14. The wireless communication system of claim 13, wherein the modulator comprises a radio frequency analog modulation circuit coupled to the digital modulation circuit; the radio frequency analog modulation circuit comprises a Phase-Locked Loop (PLL) circuit; the digital modulation circuit is configured to output the control signal to the PLL circuit, to control the PLL circuit to generate the target linear frequency modulation signal.

15. The wireless communication system of claim 13, wherein a range of values of the initial frequency of the target linear frequency modulation signal is associated with a bandwidth of a transmitted signal.

16. The wireless communication system of claim 13, wherein to obtain the frequency stepping, the bandwidth of the target linear frequency modulation signal is divided by the length of time of the target linear frequency modulation signal; the length of time of the target linear frequency modulation signal is determined by the spreading factor of the target linear frequency modulation signal.

17. The wireless communication system of claim 13, wherein the target linear frequency modulation signal comprises a first target linear frequency modulation signal and a second target linear frequency modulation signal, wherein the first target linear frequency modulation signal increases linearly over time, and the second target linear frequency modulation signal decreases linearly over time.

18. The wireless communication system of claim 13, wherein the processor is further configured to output the first frequency modulation value to the synchronous buffer to control the synchronous buffer to adjust read-write address; the processor comprises:
- a discrete fourier transform unit, configured to read the $i^{th}$ sampled signal from the synchronous buffer and to multiple the $i^{th}$ sampled signal by a conjugate signal of the $i^{th}$ local linear frequency modulation signal to obtain a first product, the first product is subjected to first discrete fourier transform to obtain a first frequency modulation value and a first residual fractional frequency deviation; the first frequency modulation value is output to a local linear frequency modulation signal generation unit; $i^{th}$ sampled signal is multiplied by the conjugate signal of the adjusted $i^{th}$ local linear frequency modulation signal output from the local linear frequency modulation signal generation unit to obtain a second product, the second product is subjected to second discrete fourier transform to obtain a second frequency modulation value and a second residual fractional frequency deviation; the first frequency modulation value and the second frequency modulation value are output the adder, respectively; the second residual fractional frequency deviation is output to an accumulator;
- the local linear frequency modulation signal generation unit, configured to adjust the $i^{th}$ local linear frequency modulation signal based on the first frequency modulation value and the residual fractional frequency deviation accumulative value corresponding to the $i^{th}$ sampled signal, and configured to output the adjusted $i^{th}$ local linear frequency modulation signal to the discrete fourier transform unit;
- the accumulator, configured to add the second residual fractional frequency deviation and the residual fractional frequency deviation accumulative value corresponding to the $i^{th}$ sampled signal to obtain a sum, and the sum is considered as a residual fractional frequency deviation accumulative value corresponding to the $(i+1)^{th}$ sampled signal.

19. The wireless communication system of claim 18, wherein the discrete fourier transform unit is configured to calculate the first residual fractional frequency deviation using the following formula $$\text{frac\_freq}_1 = \frac{|\text{right\_bin}_1 - \text{left\_bin}_1|}{|\text{max\_val}_1|};$$

wherein $\text{frac\_freq}_1$ is the first residual fractional frequency deviation, $\text{max\_val}_1$ is the maximum value in the first discrete fourier transform, $\text{right\_bin}_1$ is the result obtained from the discrete fourier transform at a position adjacent to the right side of $\text{max\_val}_1$, and $\text{left\_bin}_1$ is the result obtained from the discrete fourier transform at a position adjacent to the left side of $\text{max\_val}_1$; and the discrete fourier transform unit is configured to calculate the second residual fractional frequency deviation using the following formula $$\text{frac\_freq}_2 = \frac{|\text{right\_bin}_2 - \text{left\_bin}_2|}{|\text{max\_val}_2|};$$

wherein $\text{frac\_freq}_2$ is the second residual fractional frequency deviation, $\text{max\_val}_2$ is the maximum value in the second discrete fourier transform, $\text{right\_bin}_2$ is the result obtained from the discrete fourier transform at a position adjacent to the right side of $\text{max\_val}_2$, and $\text{left\_bin}_2$ is the result obtained from the discrete fourier transform at a position adjacent to the left side of $\text{max\_val}_2$.

20. The wireless communication system of claim 13, wherein the processor further comprises a first frequency mixer, the first frequency mixer is configured for frequency mixing an output of the synchronous buffer and an output of the local linear frequency modulation signal, and a result from the frequency mixing is output to the discrete fourier transform unit;
the demodulator further comprising a second frequency mixer and a digital low-pass filter, wherein the second frequency mixer is configured to remove intermediate frequency from the target linear frequency modulation signal output by a radio frequency circuit and to remove an integer frequency deviation from the target linear frequency modulation signal output by a radio frequency circuit, and the processed target linear frequency modulation signal is output to the digital low-pass filter; and
the digital low-pass filter is configured to filter the processed target linear frequency modulation signal, and the filtered target linear frequency modulation signal is output to the synchronous buffer.

* * * * *